US009116572B2

(12) United States Patent
Lin et al.

(10) Patent No.: US 9,116,572 B2
(45) Date of Patent: Aug. 25, 2015

(54) DISAMBIGUATION OF TOUCH INPUT EVENTS ON A TOUCH SENSOR PANEL

(71) Applicant: Apple Inc., Cupertino, CA (US)

(72) Inventors: Albert Lin, Sunnyvale, CA (US); David H. C. Shih, Sunnyvale, CA (US); Martin Paul Grunthaner, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 88 days.

(21) Appl. No.: 13/942,588

(22) Filed: Jul. 15, 2013

(65) Prior Publication Data

US 2014/0306924 A1 Oct. 16, 2014

Related U.S. Application Data

(60) Provisional application No. 61/812,184, filed on Apr. 15, 2013.

(51) Int. Cl.
*G06F 3/041* (2006.01)
*G06F 3/044* (2006.01)

(52) U.S. Cl.
CPC .............. *G06F 3/0418* (2013.01); *G06F 3/044* (2013.01); *G06F 3/0416* (2013.01)

(58) Field of Classification Search
CPC ......... G06F 3/041; G06F 3/044; G06F 3/045; G06F 3/0416; G06F 3/0418; G06F 2203/4104
USPC .......................................... 345/173, 174, 178
See application file for complete search history.

(56) References Cited

U.S. PATENT DOCUMENTS

| 5,483,261 | A | 1/1996 | Yasutake |
| 5,488,204 | A | 1/1996 | Mead et al. |
| 5,825,352 | A | 10/1998 | Bisset et al. |
| 5,835,079 | A | 11/1998 | Shieh |
| 5,880,411 | A | 3/1999 | Gillespie et al. |
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,690,387 | B2 | 2/2004 | Zimmerman et al. |
| 6,730,863 | B1 * | 5/2004 | Gerpheide et al. ......... 178/18.02 |
| 7,015,894 | B2 | 3/2006 | Morohoshi |

(Continued)

FOREIGN PATENT DOCUMENTS

| JP | 2000-163031 A | 6/2000 |
| JP | 2002-342033 A | 11/2002 |
| WO | WO-2014/172058 A1 | 10/2014 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Tom Sheng
(74) *Attorney, Agent, or Firm* — Morrison & Foerster LLP

(57) ABSTRACT

A touch input device configured to detect a touch input event and determine if the touch input event is caused by a floating object is provided. The touch input device includes one or more electrodes that scanned with a set of stimulation signals to first detect the presence of a touch event and then scanned with subsequent sets of stimulation signals in order to determine if the touch event is from a grounded object, a poorly grounded object, or a floating object.

22 Claims, 13 Drawing Sheets

(56) References Cited

U.S. PATENT DOCUMENTS

| | | | |
|---|---|---|---|
| 7,184,064 B2 | 2/2007 | Zimmerman et al. | |
| 7,663,607 B2 | 2/2010 | Hotelling et al. | |
| 8,479,122 B2 | 7/2013 | Hotelling et al. | |
| 8,773,146 B1* | 7/2014 | Hills et al. | 324/658 |
| 8,982,097 B1* | 3/2015 | Kuzo et al. | 345/174 |
| 2006/0197753 A1 | 9/2006 | Hotelling | |
| 2009/0174688 A1 | 7/2009 | Westerman | |
| 2010/0292945 A1 | 11/2010 | Reynolds et al. | |
| 2011/0006832 A1 | 1/2011 | Land et al. | |
| 2011/0061949 A1 | 3/2011 | Krah et al. | |
| 2012/0050214 A1* | 3/2012 | Kremin et al. | 345/174 |
| 2012/0293447 A1* | 11/2012 | Heng et al. | 345/174 |
| 2013/0207935 A1* | 8/2013 | Toda et al. | 345/174 |
| 2014/0092033 A1* | 4/2014 | Chang et al. | 345/173 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

International Search Report mailed Jun. 18, 2014, for PCT Application No. PCT/US/2014/031336, seven pages.

* cited by examiner

US 9,116,572 B2

DISAMBIGUATION OF TOUCH INPUT EVENTS ON A TOUCH SENSOR PANEL

FIELD OF THE DISCLOSURE

This relates generally to a touch sensor panel and touch controller that can identify and differentiate touches from electrically grounded users or objects, touches from poorly grounded users or objects, or false touches registered by floating objects such as water on a touch sensor panel.

BACKGROUND OF THE DISCLOSURE

Many types of input devices are available for performing operations in a computing system, such as buttons or keys, mice, trackballs, joysticks, touch sensor panels, touch screens, and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens generally allow a user to perform various functions by touching (e.g., physical contact or near-field proximity) the touch sensor panel using a finger, stylus or other object at a location often dictated by a user interface (UI) being displayed by the display device. In general, touch screens can recognize a touch event and the position of the touch event on the touch sensor panel, and the computing system can then interpret the touch event in accordance with the display appearing at the time of the touch event, and thereafter can perform one or more actions based on the touch event.

However, the performance from a touch device can be compromised or degraded if the user is poorly grounded or if floating objects such as water drops make contact with the touch screen. For instance, a touch screen may not be able to discriminate between a touch input event from a poorly grounded user or object and a water drop making contact with the surface of the touch screen. This can degrade performance of the touch sensor panel since the device would want to recognize touch events from a poorly grounded user while at the same time ignore touch events generated by water drops on the touch screen.

SUMMARY OF THE DISCLOSURE

This relates to a touch sensor panel configured to distinguish touch events caused by a poorly grounded user or object from floating objects such as water drops making contact with the touch sensor panel. The panel can be configured to include circuitry that drives one or more sensing electrodes with multiple sets of driving signals each set of driving signals being used in different (not necessarily consecutive) time periods. The panel can measure current flowing in and out of the one or more sensing electrodes during all of the time periods and determine if a touch event was created by a well grounded object or user a poorly grounded object or user, or if the object is floating (i.e, not connected to ground at all).

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates to a touch sensor panel and touch controller which can have the ability to not only sense touch events, but to disambiguate touch events generated by conductors with varying levels of groundedness. The touch sensor panel can be scanned one or more times with particular combinations of drive signals and determine if a detected touch input event is from a well grounded or poorly grounded object, and determine if the touch input event is from a floating object such as a drop of water.

Although examples disclosed herein may be described and illustrated herein primarily in terms of self-capacitance touch sensor panels, it should be understood that the examples are not so limited, but are additionally applicable to any capacitive touch sensor panel such as a mutual capacitance touch sensor panel. Furthermore, although examples disclosed herein relate to a method of disambiguating detected touch input events on a touch sensor panel, it should be understood that the examples are not so limited, but may be additionally applicable to any capacitive touch sensor device such as a capacitive trackpad.

Figure 1A:
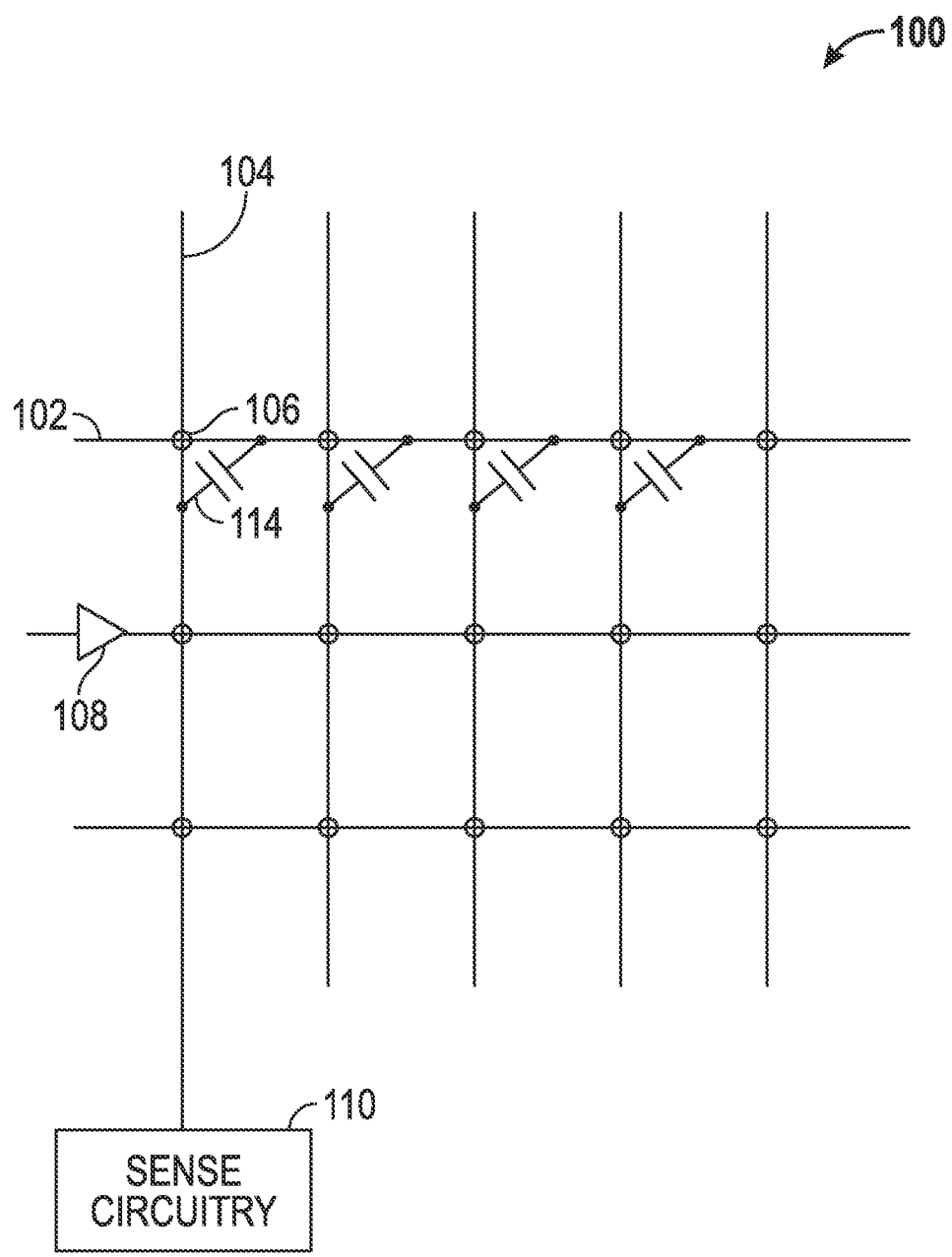
FIG. 1a illustrates an exemplary mutual capacitance touch sensor circuit according to examples of the disclosure.

FIG. 1a illustrates an exemplary touch sensor panel 100 according to some examples of the disclosure. Touch sensor panel 100 can include an array of touch nodes 106 that can be formed by a two-layer electrode structure separated by a dielectric material, although in other examples the electrodes can be formed on the same layer. One layer of electrodes can include a plurality of drive lines 102 positioned perpendicular to another layer of electrodes comprising a plurality of sense lines 104, with each of the nodes 106 having an associated mutual capacitance 114 (also referred to as coupling capacitance), although in other examples, the drive and sense lines can be positioned in non-orthogonal arrangements. The drive lines 102 and sense lines 104 can cross over each other in different planes separated from one another by a dielectric. Each point at which a drive line 102 intersects a sense line 104 can create a touch node 106. Thus, for example, a panel that contains 20 drive lines 102 and 15 sense lines 104 will have 300 touch nodes available to detect touch or proximity events.

Drive lines 102 (also referred to as rows, row traces, or row electrodes) can be activated by a stimulation signal provided by respective drive circuits 108. Each of the drive circuits 108 can include an alternating current (AC) or unipolar pulsatile voltage source referred to as a stimulation signal source. To sense touch event(s) on the touch sensor panel 100, one or more of the drive lines 102 can be stimulated by the drive circuits 108, and the sense circuitry 110 can detect the resulting change in the charge coupled onto the sense lines 104 in the form of a change in the amplitude of the coupled stimulation signal. The change in voltage amplitude values can be indicative of a finger or conductive object touching or in proximity to the panel. The detected voltage values can be representative of node touch output values, with changes to those output values indicating the node locations 106 where the touch or proximity events occurred and the amount of touch that occurred at those location(s).

Figure 1B:
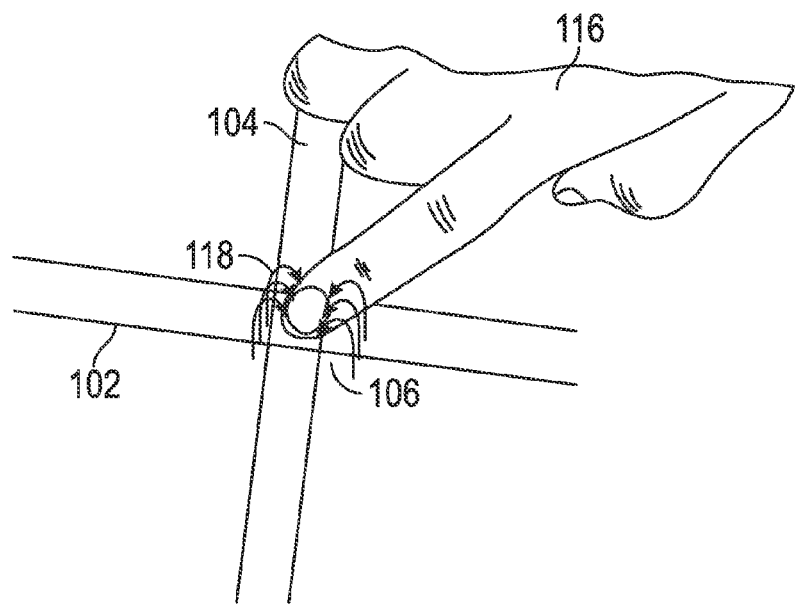
FIG. 1b illustrates an exemplary touch node and the effect that a finger touching the node has on coupled charge according to examples of the disclosure.

FIG. 1b illustrates an exemplary touch node and the effect that a finger touching the node can have on coupled charge according to one disclosed example. When drive line 102 is stimulated by a signal, electric field lines 118 can form between drive line 102 and sense line 104 due to the mutual capacitance between the drive and sense line, and charge can be coupled from the drive line to the sense line. When a finger or conductive object 116 comes into contact or near proximity to the touch node 106 created by the intersection of drive line 102 and sense line 104, the object can block some of the electric field lines and the amount of charge coupled between the drive and sense line can decrease, with some of the charge being coupled into the finger or object. This decrease in charge coupled onto sense line 104 from drive line 102 can be detected by sense circuitry 110.

Figure 1C:
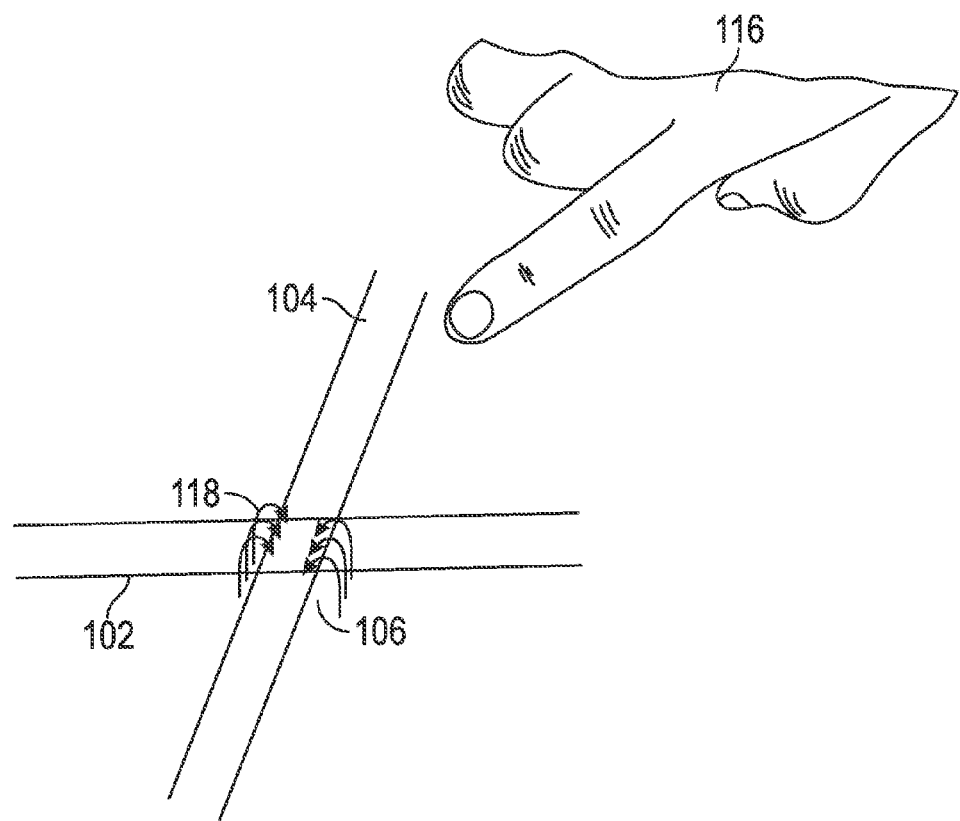
FIG. 1c illustrates another exemplary touch node and the effect that the absence of a finger has on coupled charge according to examples of the disclosure.

FIG. 1c illustrates an exemplary touch node and the effect that the absence of a finger can have on coupled charge according to one disclosed example. When finger 116 is removed from touch node 106, the charge emanating from drive line 102 is no longer partially coupled into finger 116 and thus the amount of charge coupled into sense line 102 can increase. Finger 116 generally can only couple charge from the drive line 102 if it is touching or in near proximity to touch node 106 and blocking some electric field lines 118. Once the finger 116 is moved away from touch node 106 and is a certain distance away from the node, then the charge is no longer coupled onto finger 116 and the touch sensor panel can no longer detect the presence of the finger and will not register a touch or proximity event. Thus, capacitive touch sensor panels which employ mutual capacitance to detect touch or proximity events often have a very limited range of distance over which the system can detect proximity events.

Figure 2:
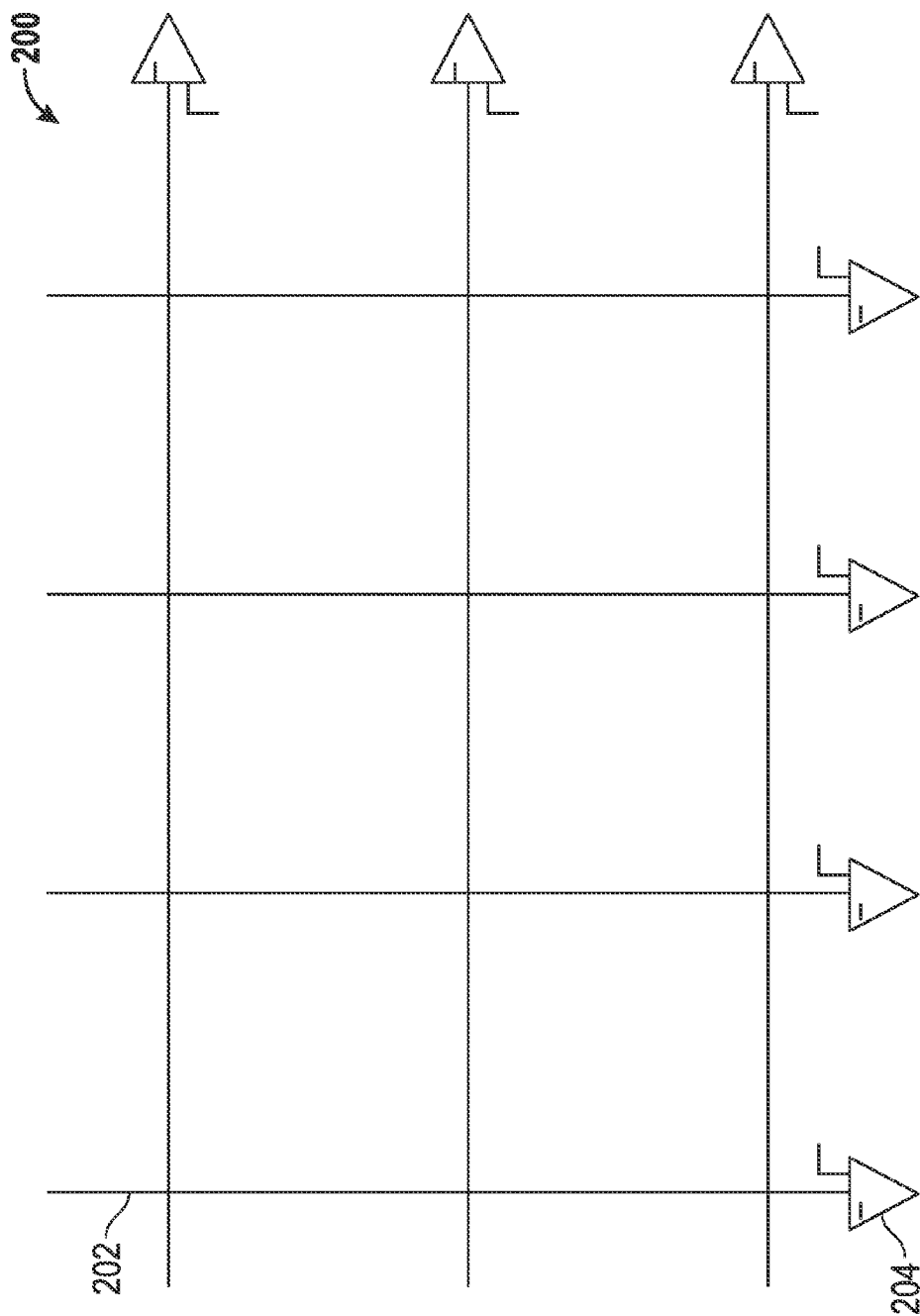
FIG. 2 illustrates an exemplary self-capacitance touch sensor circuit according to examples of the disclosure.

Touch sensor panels that employ self-capacitance to detect touch or proximity events can be used to detect the presence of a finger or object that is further away from the touch sensor panel than a panel which uses mutual capacitance. FIG. 2 illustrates an exemplary self-capacitance touch sensor circuit 200 according to one disclosed example. Self-capacitive touch sensor panel circuit 200 contains electrodes 202 which are connected to sense circuitry 204 and have a self-capacitance to ground. When an object touches or is in close proximity with the electrode, an additional capacitance can be formed between the electrode and ground through the object, which can increase the self-capacitance of the electrode. This change in the self-capacitance of an electrode 202 can be detected by sensing circuit 204. Changes in self-capacitance can be created when objects or fingers are further away from the touch panel, as opposed to mutual capacitance touch panels which require the finger or object to be either touching or in near proximity to panel in order to sense a touch or proximity event. Unlike mutual capacitance touch sensor 100, each electrode of the circuit acts as a touch node, rather than the intersections of orthogonal electrodes.

Figure 3A:
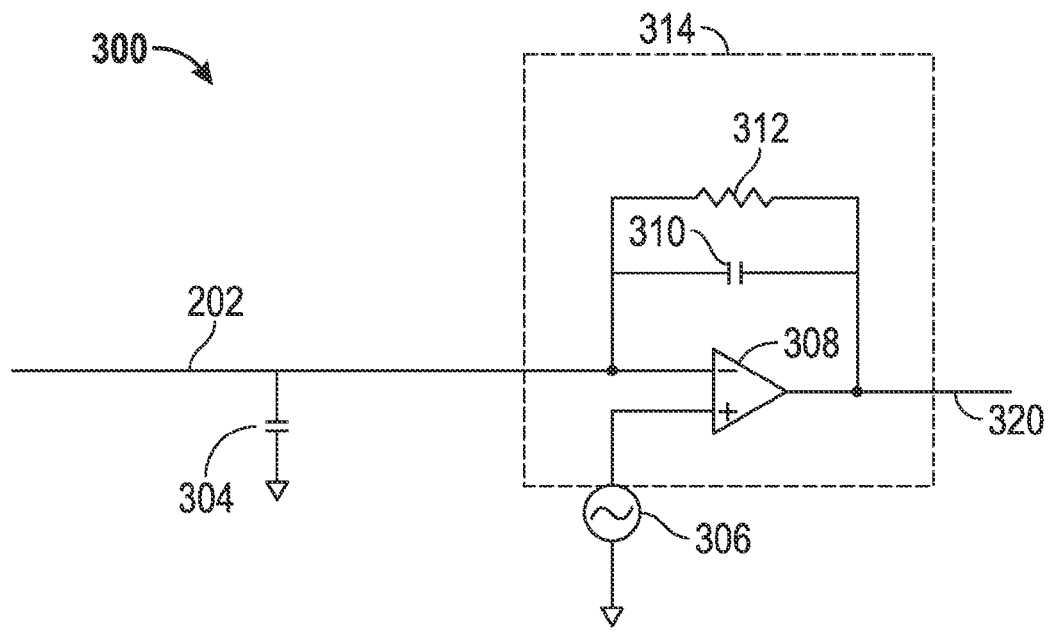
FIG. 3a illustrates an exemplary electrical circuit corresponding to a self-capacitance touch sensor electrode and sensing circuit according to one disclosed example.

FIG. 3a illustrates an exemplary electrical circuit corresponding to a self-capacitance touch sensor electrode and sensing circuit according to one disclosed example. Electrode 202 can have a self-capacitance 304 to ground associated with it. Touch electrode 202 can be coupled to sensing circuit 314. Sensing circuit can include an operational amplifier 308, feedback resistor 312, feedback capacitor 310 and an input voltage source 306, although other configurations can be employed. For example, feedback resistor 312 can be replaced by a switched capacitor resistor in order to minimize any parasitic capacitance effect caused by a variable feedback resistor. The touch electrode can be coupled to the inverting input of operation amplifier 308. An AC voltage source 306 (Vac) can be coupled to the non-inverting input of operation amplifier 308. In some examples, voltage source 306 can also be a DC voltage source. Although not shown in FIG. 3, the non-inverting input of operational amplifier 308 can be switched between the AC voltage source 306 and a DC voltage source such as a reference voltage or ground. The touch sensor circuit 300 can be configured to sense changes in self-capacitance 304 induced by a finger or object either touching or in proximity to the touch sensor panel. The output 320 of the touch sense circuit 300 can be used to determine the presence of a touch or proximity event. The output 320 can either be used by a processor to determine the presence of a proximity or touch event, or output 320 can be inputted into a discrete logic network to determine the presence of a touch or proximity event.

Figure 3B:
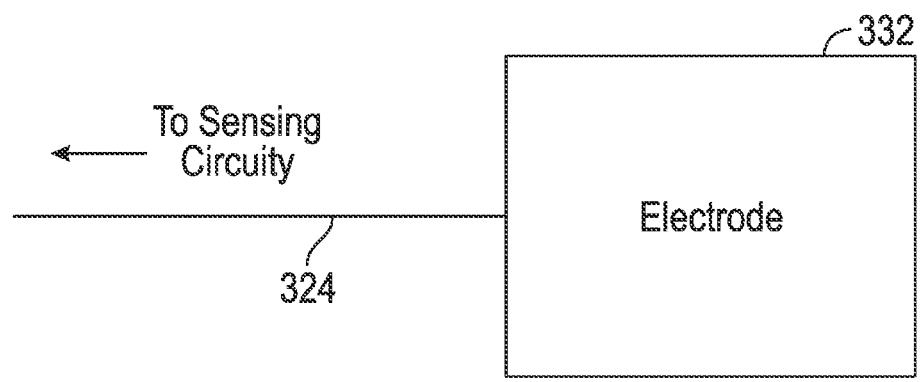
FIG. 3b illustrates another exemplary electrical circuit corresponding to a self-capacitance touch sensor electrode according to examples of the disclosure.

FIG. 3b illustrates another exemplary electrical circuit corresponding to a self-capacitance touch sensor electrode according to examples of the disclosure. The electrodes 202 described in FIGS. 2 and 3 can be replaced with conductive pad 322 that can also be formed of ITO or other conductive material. A conductive trace 324 can connect the conductive pad to sense circuitry as described above with respect to FIG. 3a.

Figure 4:
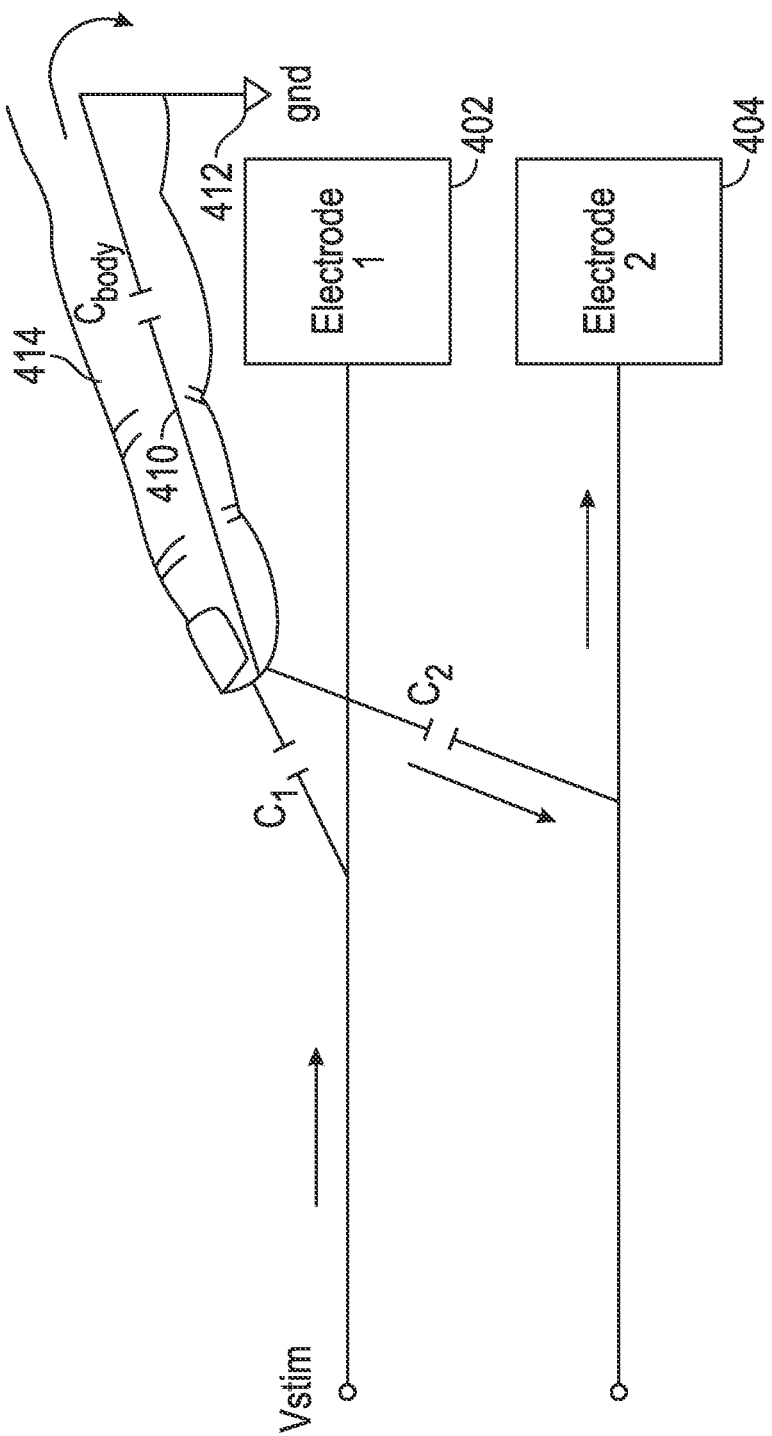
FIG. 4 illustrates an exemplary set of electrodes with a finger proximate to both electrodes according to examples of the disclosure.

FIG. 4 illustrates an exemplary set of electrodes with a finger proximate to both electrodes. First electrode 402 and second electrode 404 can be adjacent to one another, or in other examples could be proximate to one another with intervening rows of electrodes in between. When a finger 414 touches or comes into proximity with electrode 402 or electrode 404, a series of capacitive couplings can be created between the electrodes and the finger. As an example, when finger 414 comes into proximity with electrode 402 and electrode 404, a first capacitance C1 can be created between electrode 402 and finger 414. If electrode 404 is close enough, a second capacitance C2 can be created between electrode 404 and finger 414. The finger 414 can also have an effective capacitance $C_{body}$, which can represent the effective impedance from the user's body to the device's ground 412. The amount of grounding of the finger 414 can vary. For instance, finger 414 can be poorly grounded, i.e., forming a high impedance path, with $C_{body}$ going to OF between the finger and ground. In other examples, finger 414 can be well grounded, forming a low impedance path, with $C_{body}$ going to infinity, between the finger and ground.

The amount of grounding of finger 414 can have an impact on the currents flowing into and out of a given electrode. For instance, when the finger is well grounded, when a signal Vstim is applied to electrode 402, the signal can travel to the finger via C1 through C body and then to ground 412, and may not travel into electrode 404. In FIG. 4, Vstim can be a signal generated by input voltage source 306 (see FIG. 3) in the sensing circuit, wherein the configuration of the amplifier causes this signal to appear on the inverting input of the amplifier, and thus on the electrode coupled to the inverting input. Since, in this example, finger 414 is well grounded, little to no signal Vstim can be coupled into electrode 404.

When electrode 402 is stimulated with Vstim, some of the signal can be coupled into finger 414 via capacitance C1. However, instead of travelling to ground 412 via $C_{body}$, since the finger has a high impedance connection to ground, the signal coupled into C1 may travel in part to electrode 404 via capacitance C2. This scenario can cause the touch sensor panel to wrongly estimate a change in the self-capacitance in electrode 404. However, rather than the change being caused by proximity of the finger 414 to electrode 404, some component of the change in self-capacitance has been caused by the parasitic capacitive pathway through C1 and C2 created by the poorly grounded finger.

Figure 5:
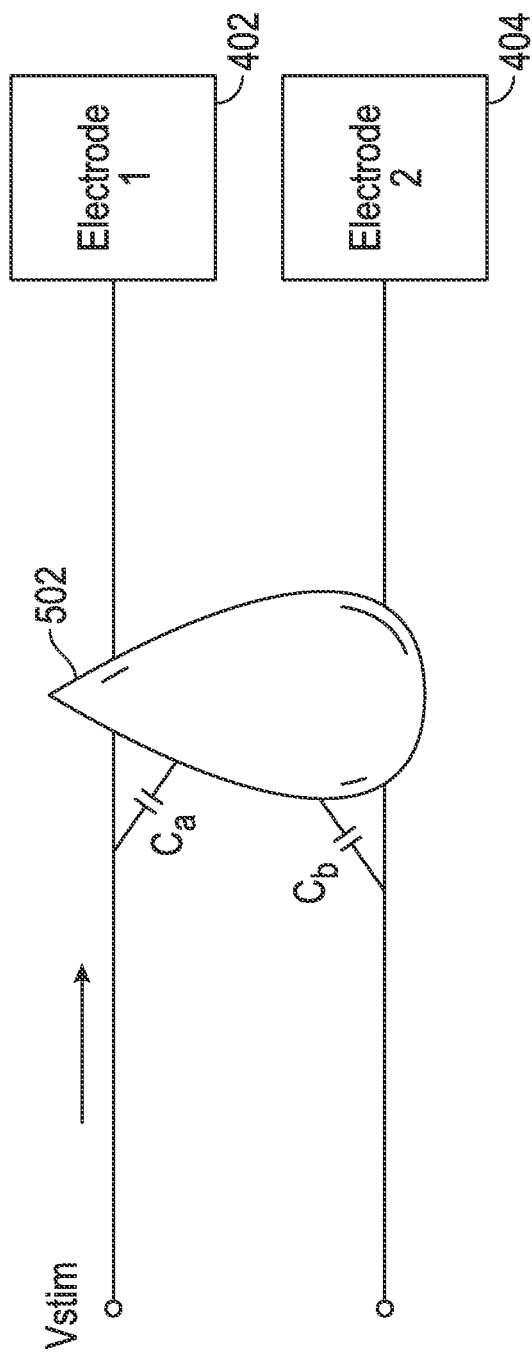
FIG. 5 illustrates an exemplary set of electrodes with a floating object such as a water drop proximate to both electrodes according to examples of the disclosure.

FIG. 5 illustrates an exemplary set of electrodes with a floating object such as a water drop proximate to both electrodes. In this example, a water drop 502 can be proximate to both electrodes 402 and 404. The presence of the water drop can create capacitances between electrode 402 and the water drop ($C_a$) and between electrode 404 and water drop ($C_b$). In contrast to the example of FIG. 4, a floating object such as a water drop may have very little to no grounding. Thus, in the example of FIG. 5, when Vstim is applied to electrode 402, the signal can be coupled onto electrode 404 via the capacitive pathway created by $C_a$ and $C_b$. In this way water may be confused with a poorly grounded user and the device may register false touches.

It may be beneficial to have a touch sensor panel that can detect touch events whether the user is poorly grounded or sufficiently grounded. Furthermore, it may be beneficial to have a touch sensor panel that can ignore detected inputs that were created by floating objects such as water drops. Therefore, it can be beneficial to have a touch sensor that is able to receive a touch input and determine (1) if the object touching the panel is grounded, and (2) if the object is found to be poorly grounded, distinguish between a poorly grounded user who intends to input a touch and a floating object such as a water droplet that is not intended to provide a touch input. If the touch input event is found to be from a poorly grounded user, the touch sensor panel can compensate the data received to account for the effects caused by a poorly grounded user. If the touch input event is found to be a floating object such as a water drop, then the touch sensor panel can simply ignore the input and/or alert the system host about the possibility of a floating object laying on top of the touch panel sensor.

Figure 6:
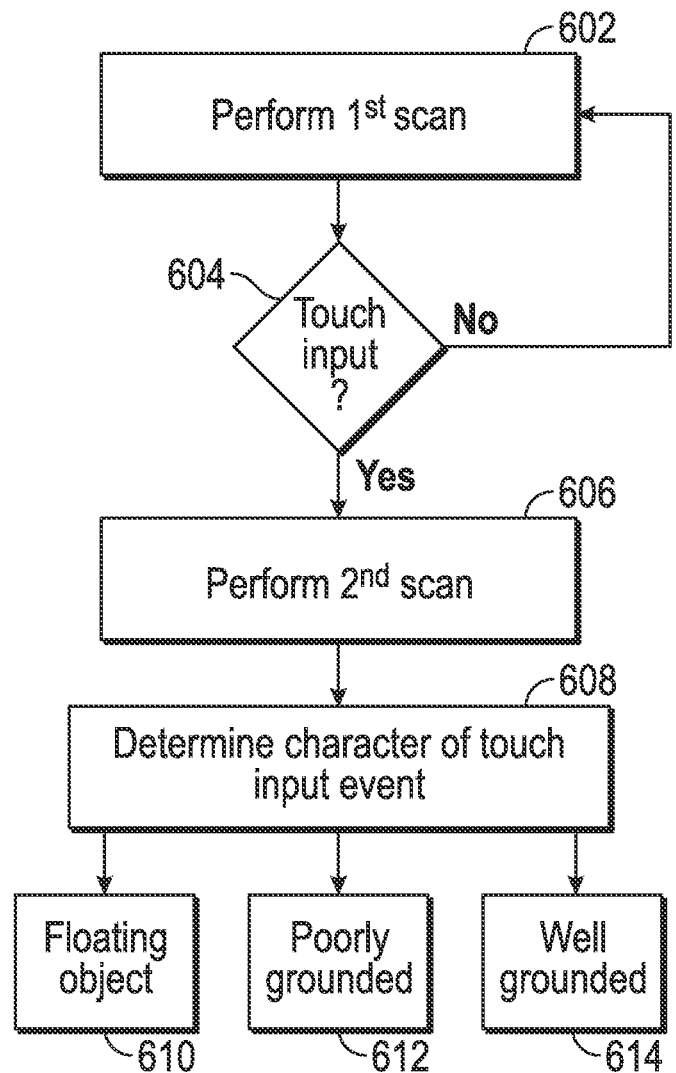
FIG. 6 illustrates an example flow chart for disambiguating a touch input event according to examples of the disclosure.

FIG. 6 illustrates an example flow chart for disambiguating a touch input event according to examples of the disclosure. At 602, a first scan of the touch electrodes can be performed. The details of the first scan are described in further detail below. The method then moves to 604. At 604, a touch controller can receive the signals measured from the first scan and determine if there is a touch input. If no touch input is detected then the method can return to 602 and repeat the scan until a touch input is detected. If a touch input is detected then the method can move to 606 where a second scan is performed. The details of the second scan are provided further below. At 608, the measurements taken from the scan at 602 and 606 can be read and a determination can be made as to whether the detected touch was from a floating object, a poorly grounded user, or well grounded user. If the touch is determined to be from a floating object, the method can move to 610, wherein the touch detected from a floating object can be ignored. If the touch is determined to be from a poorly grounded user, the method can move to 612, wherein the touch signal can be compensated for effects caused by the poor grounding of the user. If the touch is determined to be from a well grounded user, then the method can move to 614, wherein no adjustment of the signal may be necessary.

Figure 7:
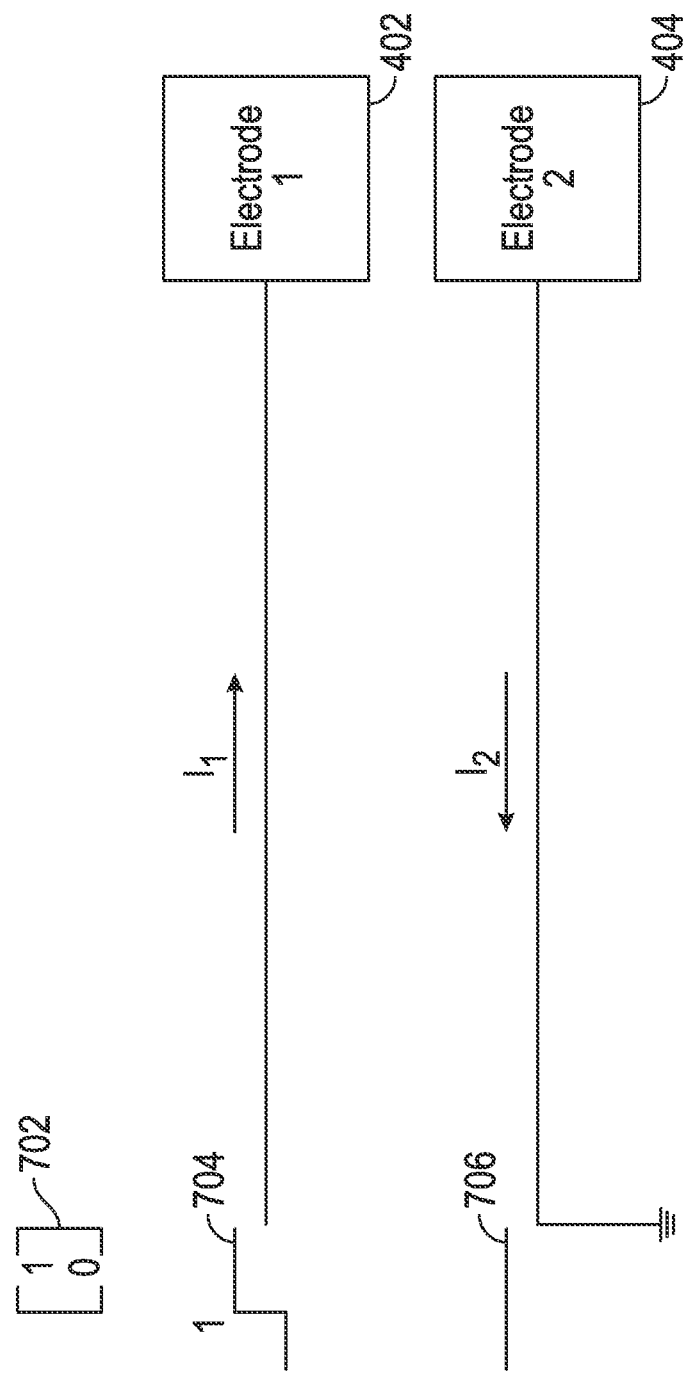
FIG. 7 illustrates an example scan to determine the presence of a touch input event according to examples of the disclosure.

FIG. 7 illustrates an example scan to determine the presence of a touch input event according to examples of the disclosure. The scan discussed with reference to FIG. 7 can correspond to the first scan at 602 of FIG. 6. During the scan, a signal that transitions from 0 volts to 1 volt, for example, can be input into the noninverting input of the amplifier in a sensing circuit connected to electrode 402 and used to stimulate electrode 402. Electrode 404 can be set to ground, or in other words, have a signal that is 0 volts transmitted on it during the entire scan. Since electrode 402 is stimulated with a signal that has a +1V voltage step during the scan and electrode 404 has a 0V voltage step during the scan, the scan can represented as a matrix with element 1, 0 as depicted at 702. Thus, a scan (1,0) can be implemented using a signal 704 that transitions from 0 volts to 1 volt to stimulate electrode 402 and a signal that remains the same during the entire scan such as signal 706 on electrode 404.

When the signal 704 transitions from 0 volts to 1 volt and signal 706 remains constant at 0V (i.e., ground), a current $I_1$ can be generated on electrode 402 from the source signal. If the user or object is well grounded, the charge from current $I_1$ generated in electrode 402 can couple onto a finger or object and be shunted to ground through the finger. However, if the finger or object is poorly grounded, or if the object is a floating element and has no path to ground, then the charge may get coupled back onto electrode 404 through the finger or object, and a current may be induced on electrode 404. The amount of current flowing through electrode 404 can be depicted by $I_2$. Thus, during the scan, $I_1$ and $I_2$ can be measured and a determination can be made as to the grounding condition of the user. If no current or substantially no current flows through electrode 404, then it can be determined that the detected touch input event was input by a well-grounded object. However if $I_2$ has a non-trivial or substantial value, then it can be determined that the user or object is either poorly grounded or is floating.

$I_1$ and $I_2$ can be a function of numerous parameters of the touch sensor panel. For instance $I_1$ and $I_2$ can be a function of $C_1, C_2, C_{body}$, mutual capacitances created between the individual electrodes and any other capacitances associated with the device as well as the voltages being used to stimulate the electrodes. By changing the value of the voltages being used to stimulate the electrodes, an estimate of the capacitances $C_1, C_2,$ and $C_{body}$ can be attained, and with that estimate a determination can be made as to the grounding of the object causing a touch event.

In a system that is substantially noise free (in other words, with a high signal to noise ratio), the system may be able to tell the difference between a touch created by a poorly grounded user or a touch created by a floating object. Referring back to FIG. 4, charge can be coupled onto finger 414. Some of the charge can be shunted to ground 412 through finger 414, while some of the charge can be coupled onto electrode 404. Referring back to FIG. 5, charge can be coupled onto water drop 502. Since water drop 502 is floating, the charge coupled into the water drop can substantially be transferred to electrode 404, since the water drop itself provides no path to ground. In this way, by measuring the value of $I_2$, one can differentiate between a finger and a drop of water, because a higher value of $I_2$ can indicate a drop of water. However, using only one scan can produce errors due to noise. For instance, if $I_2$ is artificially raised due to system noise, the system can be fooled into thinking the input was a water drop rather than a finger, and thus ignore a touch input it should have registered. Thus, while the first scan described above can be good at determining if the object or user is poorly grounded or not grounded at all, it may not be able to disambiguate a poorly grounded user touch from a drop of water.

Figure 8:
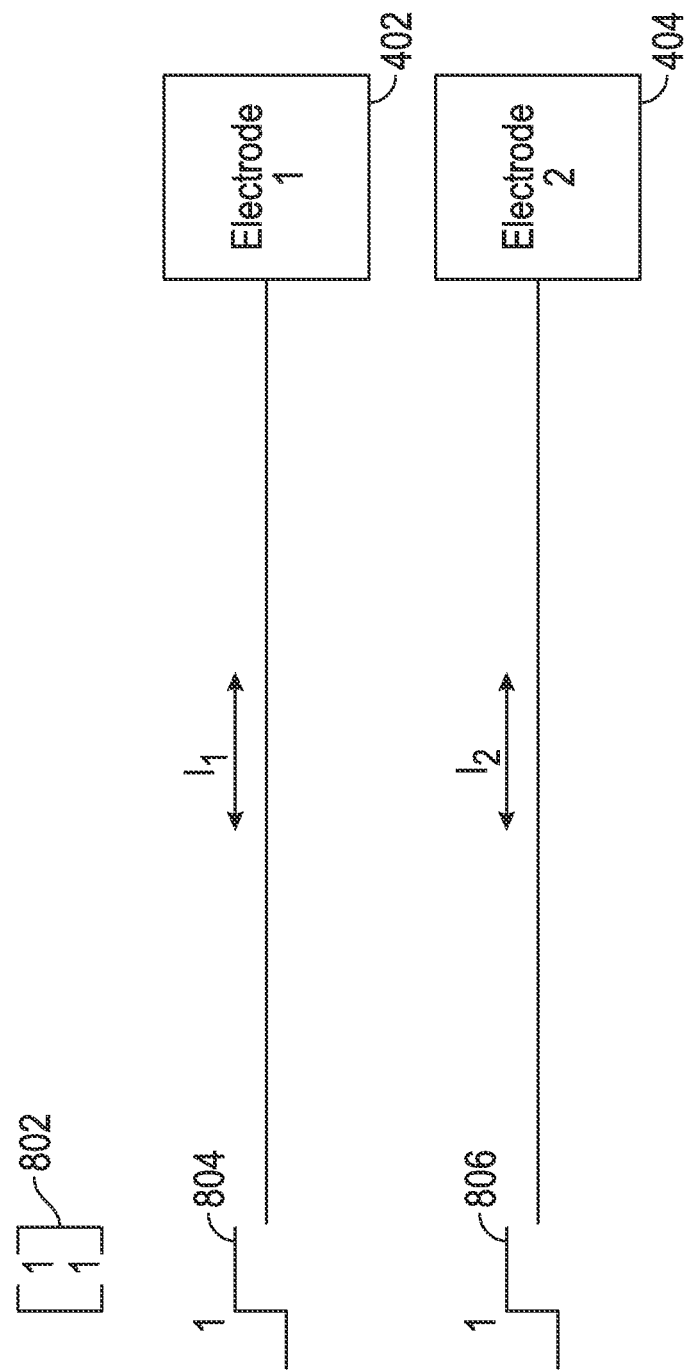
FIG. 8 illustrates an example second scan that when combined with the results of the first scan can disambiguate a poorly grounded user or object from a floating object such as a water drop according to examples of the disclosure.

FIG. 8 illustrates an example second scan that when combined with the results of the first scan can disambiguate a poorly grounded user or object from a floating object such as a water drop. The scan discussed with reference to FIG. 8 can correspond to the second scan at 606 of FIG. 6. As depicted, the scan of FIG. 8 can be depicted by matrix 802 which has elements (1,1). Thus, during the scan, electrode 402 can be stimulated by signal 804 which transitions from 0V to +1V. Electrode 404 can be stimulated with signal 806 which can also transition from 0V to +1V. Since Electrode 402 and 404 transmit substantially the same signal, they can act as shields against each other. In other words, current may not be able to be induced from one electrode to the other. Thus, if a poorly grounded user creates a touch event on electrodes 402 and 404, the charge coupled onto the finger 414 due to the current generated on electrode 402, $I_1$, may have a high impedance path to ground. Even though finger 414 may be poorly grounded, because electrode 404 has substantially the same signal being transmitted on it as electrode 402, the two electrodes remain at substantially the same potential, and the poorly grounded finger will tend to follow along. The result is that less charge may be coupled from electrode 402 and 404 to the finger 414, resulting in a smaller induced current $I_1$ and $I_2$ electrode 404. If a floating object such as a water drop is present that offers no path or a high impedance path to ground then little or no current can be induced from electrode 402 onto 404. Thus, in this manner a touch event can be disambiguated between being a touch from a poorly grounded user, which will generate some current during the scan of FIG. 8, and a floating object such as a water drop, which will produce substantially no current.

Figure 9:
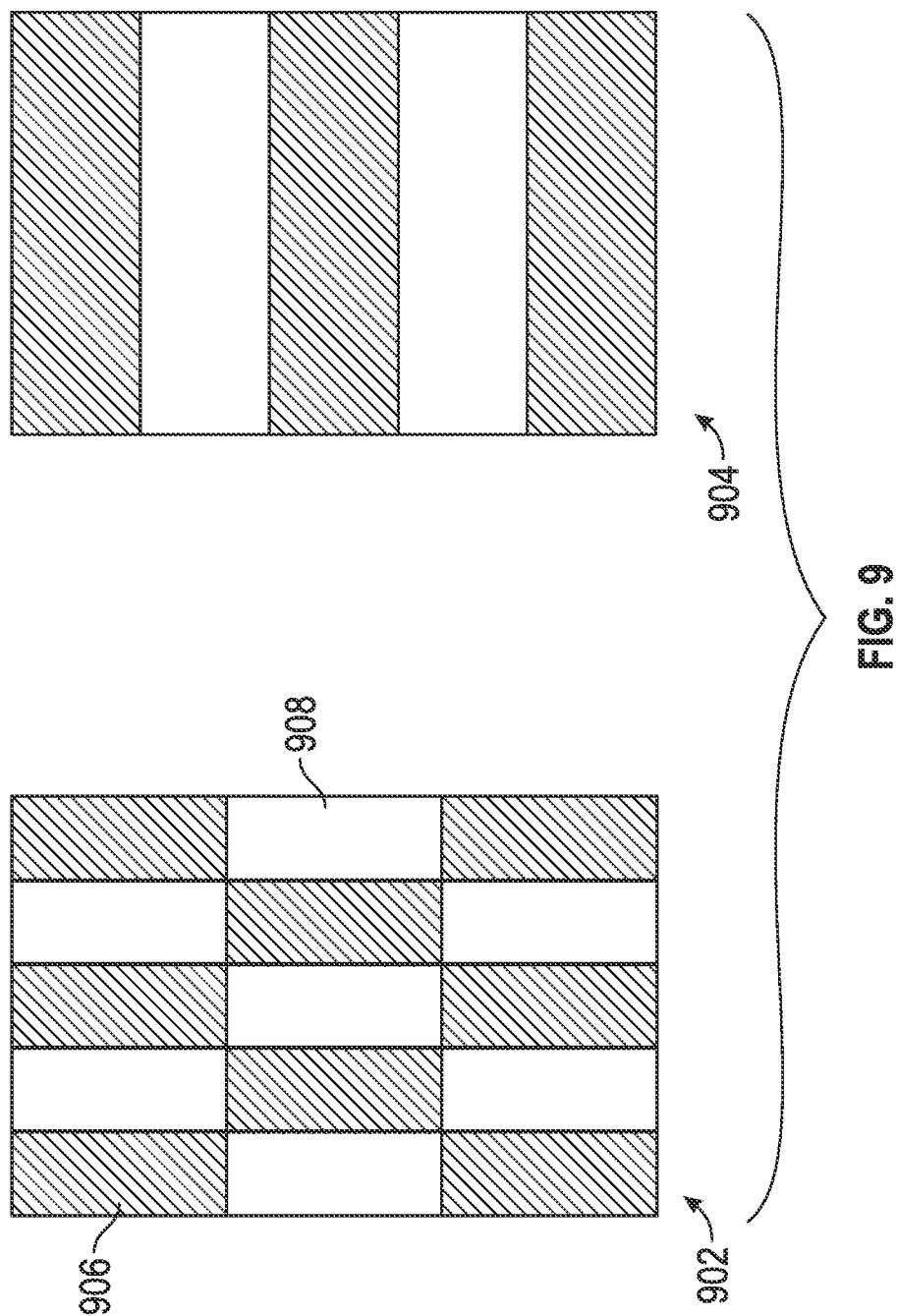
FIG. 9 illustrates an example scan pattern of a touch sensor panel according to examples of the disclosure.

FIG. 9 illustrates an example scan pattern of a touch sensor panel according to examples of the disclosure. In this example, the touch sensor panel can be divided into set, each segment having a particular scan pattern and each set containing a one or more electrodes within it. For instance, scan pattern 902 with 15 electrodes can have shaded regions 906 in which the electrodes are driven by a +1 signal (i.e., a +1V transition signal). The electrodes in the non-shaded region can be driven by a different signal. The regions of the touch sensor panel can be delineated in different patterns. For instance, 902 illustrates a checkerboard pattern, while 904 shows an alternating scan pattern.

Figure 10:
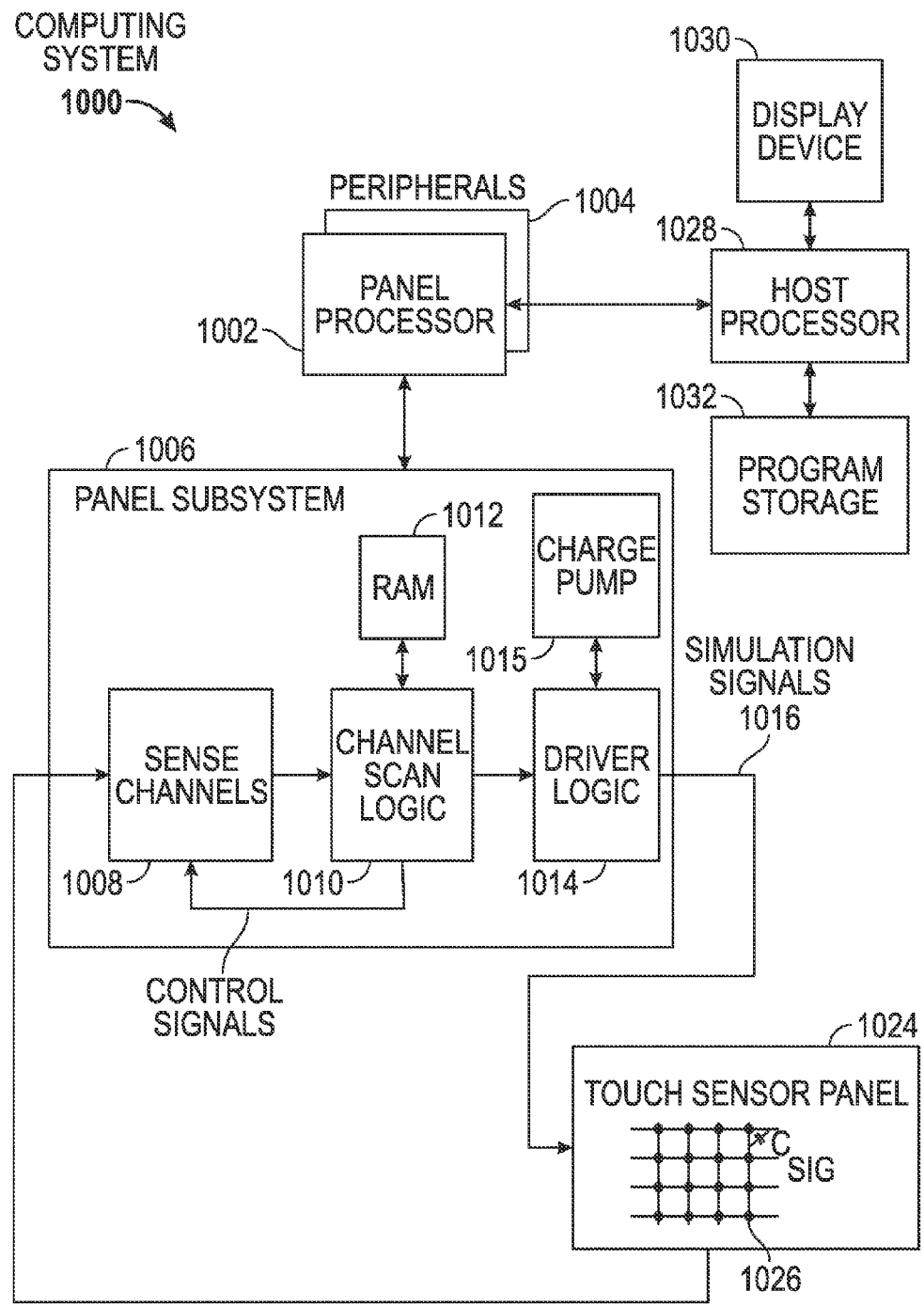
FIG. 10 illustrates an exemplary computing system including a touch sensor panel according to examples of the disclosure.

FIG. 10 illustrates exemplary computing system 1000 that can include one or more of the examples described above. Computing system 1000 can include one or more panel processors 1002 and peripherals 1004, and panel subsystem 1006. Peripherals 1004 can include, but are not limited to, random access memory (RAM) or other types of memory or storage, watchdog timers and the like. Panel subsystem 1006 can include, but is not limited to, one or more sense channels (sensing circuits) 1008 which can utilize operational amplifiers that can be configured as described above, channel scan logic 1010 and driver logic 1014. Channel scan logic 1010 can access RAM 1012, autonomously read data from the sense channels and provide control for the sense channels including calibrating the sense channels for changes in phase correlated with a parasitic capacitance. In addition, channel scan logic 1010 can control driver logic 1014 to generate stimulation signals 1016 at various frequencies and phases that can be selectively applied to drive lines of touch sensor panel 1024. In some examples, panel subsystem 1006, panel processor 1002 and peripherals 1004 can be integrated into a single application specific integrated circuit (ASIC). The panel subsystem and panel processor can be configured to perform the stimulation, scanning, touch detecting, grounding determination, and object determination described above.

Touch sensor panel 1024 can include a capacitive sensing medium having a plurality of drive lines and a plurality of sense lines, although other sensing media can also be used. Each intersection of drive and sense lines can represent a capacitive sensing node and can be viewed as picture element (node) 1026, which can be particularly useful when touch sensor panel 1024 is viewed as capturing an "image" of touch. Each sense line of touch sensor panel 1024 can drive sense channel 1008 (also referred to herein as an event detection and demodulation circuit) in panel subsystem 1006. The drive and sense lines can also be configured to act as individual electrodes in a self-capacitance touch sensing configuration.

Computing system 1000 can also include host processor 1028 for receiving outputs from panel processor 1002 and performing actions based on the outputs that can include, but are not limited to, moving an object such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 1028 can also perform additional functions that may not be related to panel processing, and can be coupled to program storage 1032 and display device 404 such as an LCD display for providing a UI to a user of the device. Display device 404 together with touch sensor panel 1024, when located partially or entirely under the touch sensor panel, can form touch screen 1018.

Note that one or more of the functions described above can be performed by firmware stored in memory (e.g. one of the peripherals 1004 in FIG. 10) and executed by panel processor 1002, or stored in program storage 1032 and executed by host processor 1028. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium that can contain or store the program for use by or in connection with the instruction execution system, apparatus, or device. The computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Figure 11A:
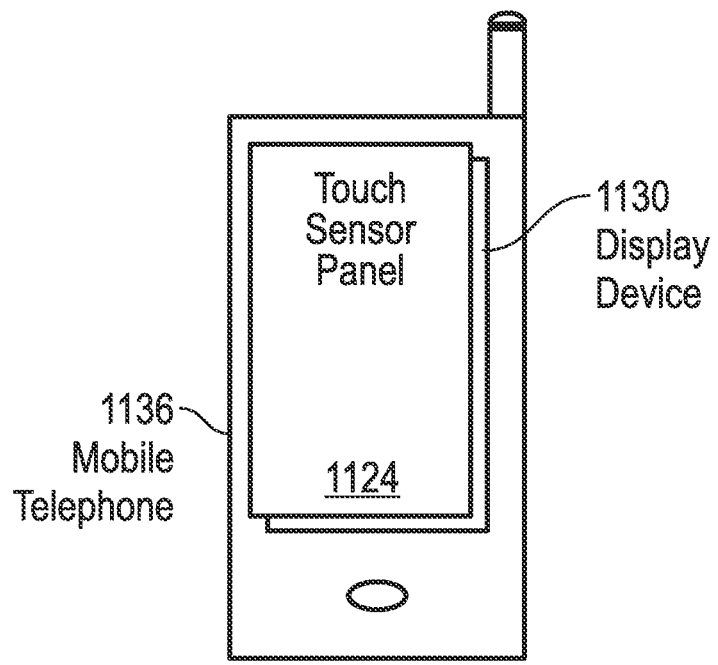
FIG. 11a illustrates an exemplary mobile telephone having a touch sensor panel that includes a touch common mode noise recovery circuit and method according to examples of the disclosure.

FIG. 11a illustrates exemplary mobile telephone 1136 that can include touch sensor panel 1124 and display device 1130, the touch sensor panel including circuitry to scan the touch sensor panel and disambiguate a user touch from a floating object according to one disclose example.

Figure 11B:
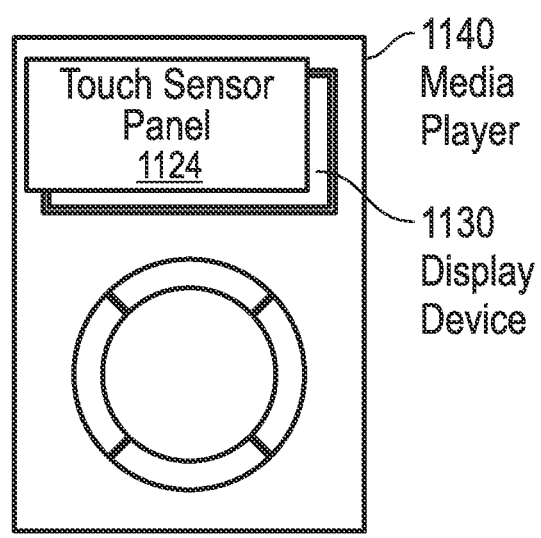
FIG. 11b illustrates an exemplary digital media player having a touch sensor panel that includes a touch common mode noise recovery circuit and method according to examples of the disclosure.

FIG. 11b illustrates exemplary digital media player 1140 that can include touch sensor panel 1124 and display device 1130, the touch sensor panel including circuitry to scan the touch sensor panel and disambiguate a user touch from a floating object according to one disclose example.

Figure 11C:
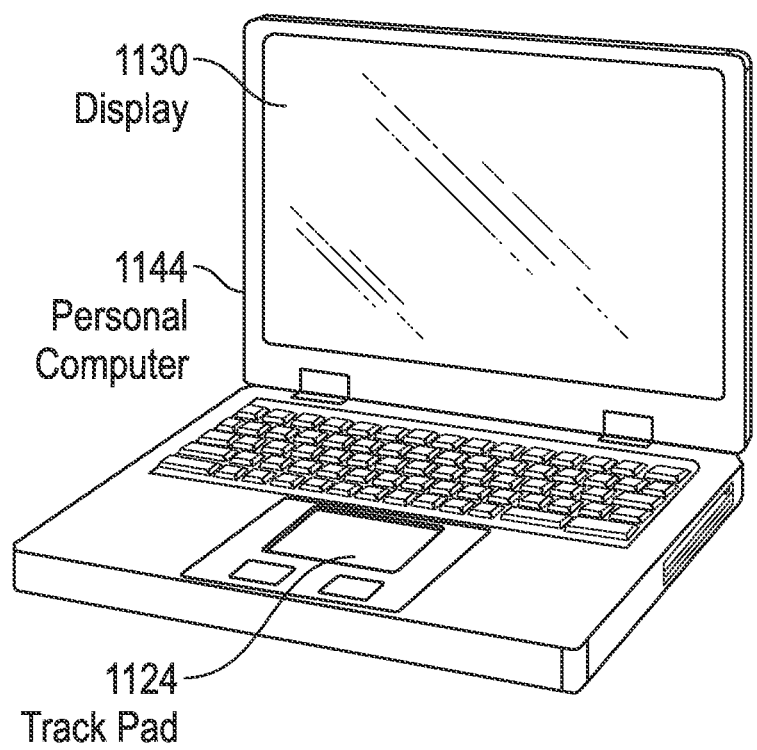
FIG. 11c illustrates an exemplary personal computer having a touch sensor panel that includes a touch common mode noise recovery circuit and method according to examples of the disclosure.

FIG. 11c illustrates exemplary personal computer 1144 that can include touch sensor panel (trackpad) 1124 and display 1130, the touch sensor panel and/or display of the personal computer (in examples where the display is part of a touch screen) including circuitry to scan the touch sensor panel and disambiguate a user touch from a floating object according to one disclose example. The mobile telephone, media player and personal computer of FIGS. 11a, 11b and 11c can achieve a wider dynamic range of sensing capabilities by switching its configuration to detect near field and far field events, and mitigating parasitic capacitance.

Although FIGS. 11a-c discuss a mobile telephone, a media player and a personal computer respectively, the disclosure is not so restricted and the touch sensor panel can be included on a tablet computer, a television, or any other device which utilizes the touch sensor panel including circuitry to switch between near field far field sensing configurations and mitigate the effects of parasitic capacitance on the touch sensor panel.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. A touch sensitive device configured to disambiguate touch events that have different levels of grounding, the touch sensitive device comprising:
   a plurality of electrodes, the plurality of electrodes coupled to sensing circuitry; and
   processing circuitry capable of:
      performing a first scan of the plurality of electrodes, wherein the first scan includes driving the plurality of electrodes with a first set of signals during a first time period and measuring a change in a parameter;
      detecting a touch or proximity event that meets a grounding threshold based on the first scan;
      in response to detecting the touch or proximity event that meets the grounding threshold, performing one or more subsequent scans of the plurality of electrodes, wherein the subsequent scans include driving the plurality of electrodes with one or more subsequent sets of signals during one or more subsequent time periods and measuring a change in the parameter; and
      determining that the touch or proximity event detected based on the first scan corresponds to a floating object based on the measured changes in the parameter from the one or more subsequent scans.

2. The device of claim 1, wherein the parameter includes a current flowing in one or more of the plurality of electrodes.

3. The device of claim 1, wherein the floating object is a water drop.

4. The device of claim 1, wherein the touch sensitive device includes a mutual capacitance touch sensor panel.

5. The device of claim 1, wherein the touch sensitive device includes a self-capacitance touch sensor panel.

6. The device of claim 1, wherein the first set of signals is different from at least one set of the one or more subsequent sets of signals.

7. The device of claim 1, wherein the first scan further includes:
   driving a first electrode of the plurality of electrodes;
   grounding a second electrode of the plurality of electrodes; and
   measuring a change in a current at the second electrode.

8. The device of claim 7, wherein detecting the touch or proximity event that meets the grounding threshold includes detecting the current at the second electrode meets a first threshold.

9. The device of claim 7, wherein the one or more subsequent scans further include:
   driving the first electrode of the plurality of electrodes with a stimulation signal;
   driving the second electrode of the plurality of electrodes with the stimulation signal; and
   measuring a change in the current at at least one of the first electrode and the second electrode.

10. The device of claim 9, wherein determining the touch or proximity event detected based on the first scan corresponds to the floating object includes detecting the current at at least the one of the first electrode and the second electrode during the one or more subsequent scans is below a second threshold.

11. The device of claim 10, the processing circuitry further capable of determining the touch or proximity event detected based on the first scan corresponds to a poorly-grounded object when the current detected at at least the one of the first electrode and the second electrode during the one or more subsequent scans meets the second threshold.

12. The device of claim 1, the processing circuitry further capable of determining the touch or proximity event detected based on the first scan corresponds to a well-grounded object when the touch or proximity event fails to meet the grounding threshold.

13. A method for disambiguating touch events that have different levels of grounding on a touch sensitive device, the method comprising:
  performing a first scan of a plurality of electrodes, wherein the first scan includes driving a plurality of electrodes with a first set of signals during a first time period and measuring a change in a parameter;
  detecting a touch or proximity event that meets a grounding threshold based on the first scan;
  in response to detecting the touch or proximity event that meets the grounding threshold, performing one or more subsequent scans of the plurality of electrodes, wherein the subsequent scans include driving the plurality of electrodes with one or more subsequent sets of signals during one or more subsequent time periods and measuring a change in the parameter; and
  determining that the touch or proximity event detected based on the first scan corresponds to a floating object based on the measured changes in the parameter from the one or more subsequent scans.

14. The method of claim 13, wherein the parameter includes a current flowing in one or more of the plurality of electrodes.

15. The method of claim 13, wherein the floating object is a water drop.

16. The method of claim 13, wherein the touch sensitive device includes a mutual capacitance touch sensor panel.

17. The method of claim 13, wherein the touch sensitive device includes a self-capacitance touch sensor panel.

18. A non-transitory computer readable storage medium having stored thereon a set of instructions for disambiguating touch events that have different levels of grounding on a touch sensitive device, that when executed by a processor causes the processor to:
  perform a first scan of a plurality of electrodes, wherein the first scan includes driving the plurality of electrodes with a first set of signals during a first time period and measuring a change in a parameter;
  detect a touch or proximity event that meets a grounding threshold based on the first scan;
  in response to detecting the touch or proximity event that meets the grounding threshold, perform one or more subsequent scans of the plurality of electrodes, wherein the subsequent scans include driving the plurality of electrodes with one or more subsequent sets of signals during one or more subsequent time periods and measure a change in the parameter; and
  determine that the touch or proximity event corresponds to a floating object based on the measured changes in the parameter from the one or more subsequent scans.

19. The non-transitory computer readable storage medium of claim 18, wherein the parameter includes a current flowing in one or more of the plurality of electrodes.

20. The non-transitory computer readable storage medium of claim 18, wherein the floating object is a water drop.

21. The non-transitory computer readable storage medium of claim 18, wherein the touch sensitive device includes a mutual capacitance touch sensor panel.

22. The non-transitory computer readable storage medium of claim 18, wherein the touch sensitive device includes a self-capacitance touch sensor panel.

* * * * *